United States Patent Office.

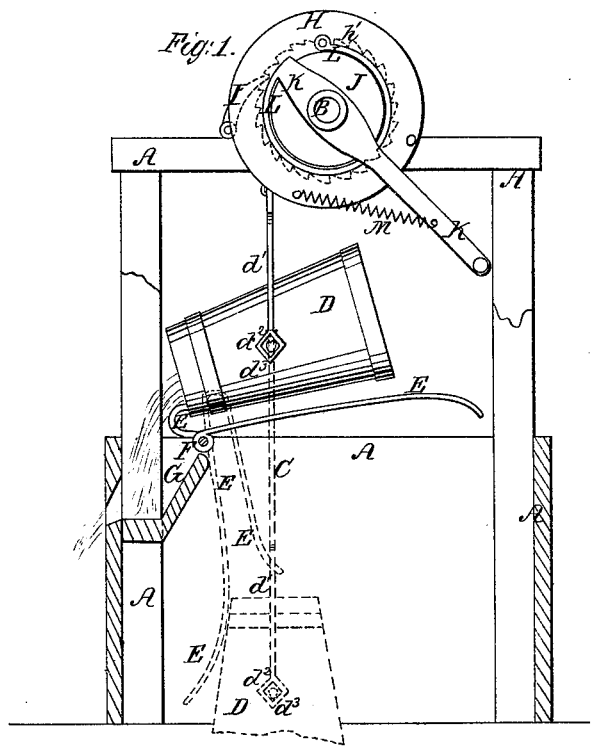
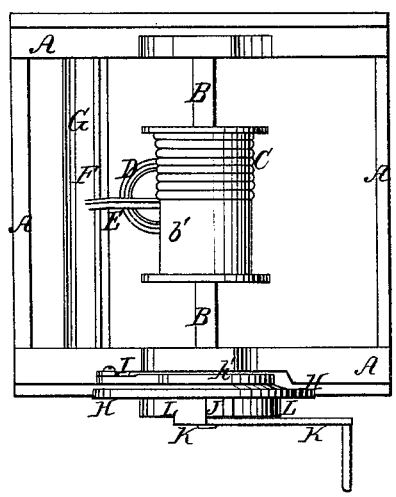

G. W. DICKERSON, OF PRAIRIETON, INDIANA.

Letters Patent No. 91,311, dated June 15, 1869.

---

IMPROVEMENT IN WATER-ELEVATORS.

---

The Schedule referred to in these Letters Patent and making part of the same.

---

*To all whom it may concern:*

Be it known that I, G. W. DICKERSON, of Prairieton, in the county of Vigo, and State of Indiana, have invented a new and improved Water-Elevator; and I do hereby declare that the following is a full, clear, and exact description thereof, which will enable others skilled in the art to make and use the same, reference being had to the accompanying drawings, forming part of this specification, in which—

Figure 1 is a side view of my improved apparatus, part of the curb and frame being broken away to show the construction.

Figure 2 is a top view of the same.

Similar letters of reference indicate like parts.

My invention has for its object to furnish an improved water-elevator, which shall be so constructed and arranged that the bucket may be at all times completely under the control of the crank, which shall be simple in construction, not liable to get out of order, and conveniently operated; and It consists in the construction and combination of various parts, as hereinafter more fully described.

A is the curb, in bearings in the upper cross-bars of the frame of which revolves the shaft B, to the middle part of which is attached the drum $b'$, to which is attached, and about which is wound the hoisting-rope C, the lower end of which is attached to the bail $d^1$ of the bucket D.

The eyes $d^2$ of the bail $d^1$ are made angular, as shown in fig. 1, to correspond with the form of the angular pivots $d^3$, attached to the sides of the bucket D, a little above its middle part.

By this construction of the bail-eyes $d^2$ and pivots $d^3$, the bucket will be held steadily while being raised, enabling the pivots to be placed lower down upon the bucket than they could otherwise be, and thus facilitating the emptying of the bucket.

The bucket D may have a valve in its bottom, opening inward, so that as the bucket is lowered into the water, it may be filled through said valve.

E is a U-shaped bar, the arms of which are of unequal length, and which is pivoted, by an eye formed upon its longer arm, near the bend, to the cross-rod F, extending horizontally across the curb A, a little above the inner edge of the receiving-trough or spout G.

The lower ends of the bent bar E are bent or inclined from each other, and the length of its shorter arm should be a little less than the length of the bucket D.

By this construction, as the bucket is raised by winding up the rope or chain C, the short arm of the bar E enters the bucket, and as it continues to rise, the said bar E tips or inclines it, so that the water is discharged into the spout G.

H is a wheel, which runs loosely upon the projecting end of the shaft B, and upon the inner side of which is formed, or to it is attached a ratchet-wheel, $h'$, upon the teeth of which rests the pawl I, which is pivoted to the frame of the curb A.

By this arrangement of the ratchet-wheel $h'$ and pawl I, the said pawl is protected from accidental displacement while operating the apparatus, thereby greatly increasing its safety.

J is a smaller wheel, which is securely and rigidly attached to the end of the shaft B.

K is the crank, which is pivoted to and works loosely upon the end of the shaft B.

To the inner end of the crank K is attached one end of the strap L, which passes around, or nearly around the fixed wheel J, and its other end is attached to the large loose wheel H, by means of a pin or bolt, as shown in fig. 1.

By this construction, by turning the crank K forward, the band or strap L is drawn so tightly upon the wheel J as to revolve the said wheel J and shaft B, winding up the rope C, and raising the bucket D.

Should the crank K escape, or be released from the hand, the band or strap L is still held with sufficient tightness upon the wheel J to support the bucket D by the action of the spring M, one end of which is attached to the crank K, and its other end to the large wheel H, as shown in fig. 1.

By moving the crank K back against the action of the spring M, the strap L is loosened upon the wheel J, allowing the bucket to descend with any desired rapidity.

Having thus described my invention,

I claim as new, and desire to secure by Letters Patent—

1. The band or strap L, in combination with the fixed wheel J, and the crank K, substantially as herein shown and described, and for the purpose set forth.

2. The crank K, in combination with the band or strap L, shaft B, and loose wheel H, substantially in the manner herein shown and described, and for the purpose set forth.

3. Connecting the bail $d^1$ to the bucket D by means of the angular eyes $d^2$, and angular pivots $d^3$, substantially as herein shown and described, and for the purposes set forth.

4. The combination and arrangement of the pawl I, ratchet-wheel $h$, loose wheel H, shaft B, fixed wheel J, band or strap L, crank K, and spring M, with each other, substantially as herein shown and described, and for the purpose set forth.

G. W. DICKERSON.

Witnesses:
JAMES B. WALKER,
T. L. JONES.